United States Patent
Weber et al.

(10) Patent No.: US 9,327,573 B2
(45) Date of Patent: May 3, 2016

(54) AIR SPRING ATTACHMENT SYSTEM

(71) Applicant: Vibracoustic CV Air Springs GmbH, Hamburg (DE)

(72) Inventors: Michael Weber, Buchholz i.d.N. (DE); Stephan Dehlwes, Norderstedt (DE)

(73) Assignee: VIBRACOUSTIC CV AIR SPRINGS GMBH, Hamburg (DE)

( * ) Notice: Subject to any disclaimer, the term of this patent is extended or adjusted under 35 U.S.C. 154(b) by 0 days.

(21) Appl. No.: 14/306,266

(22) Filed: Jun. 17, 2014

(65) Prior Publication Data
US 2014/0367900 A1    Dec. 18, 2014

(30) Foreign Application Priority Data

Jun. 17, 2013   (DE) .......................... 10 2013 106 290

(51) Int. Cl.
| | |
|---|---|
| *F16F 9/04* | (2006.01) |
| *B60G 11/28* | (2006.01) |
| *B60G 7/00* | (2006.01) |
| *B60G 9/00* | (2006.01) |
| *F16F 9/05* | (2006.01) |
| *B60G 11/27* | (2006.01) |

(52) U.S. Cl.
CPC ................ *B60G 11/28* (2013.01); *B60G 7/001* (2013.01); *B60G 9/003* (2013.01); *B60G 11/27* (2013.01); *F16F 9/057* (2013.01); *B60G 2202/152* (2013.01); *B60G 2204/11* (2013.01); *B60G 2204/126* (2013.01); *B60G 2204/44* (2013.01); *B60G 2206/424* (2013.01); *B60G 2206/82* (2013.01); *B60G 2206/91* (2013.01)

(58) Field of Classification Search
CPC ........ B60G 11/28; B60G 7/001; B60G 9/003; B60G 2202/152; B60G 2204/44; B60G 2204/126; B60G 2206/11; B60G 2206/82; B60G 2206/91; B60G 2206/424; F16F 9/05; F16F 9/057; F16D 1/0864
USPC ............ 267/64.11, 64.19, 64.23, 64.28, 122; 403/289, 297, 360

See application file for complete search history.

(56) References Cited

U.S. PATENT DOCUMENTS

| | | | | |
|---|---|---|---|---|
| 2,901,242 | A * | 8/1959 | Elliott et al. .................. | 267/256 |
| 4,012,155 | A * | 3/1977 | Morris .......................... | 403/290 |
| 4,564,177 | A * | 1/1986 | Leonard ..................... | 267/64.24 |
| 4,804,303 | A * | 2/1989 | Statkus .......................... | 411/41 |
| 5,005,265 | A * | 4/1991 | Muller ........................... | 24/453 |
| 5,143,500 | A * | 9/1992 | Schuring et al. .............. | 411/339 |
| 5,326,082 | A | 7/1994 | Ecktman | |
| 5,342,139 | A | 8/1994 | Hoffman | |
| 5,996,980 | A * | 12/1999 | Frey et al. .................. | 267/64.27 |
| 6,398,179 | B1 | 6/2002 | Soles | |
| 2006/0226586 | A1 | 10/2006 | Levy | |

FOREIGN PATENT DOCUMENTS

| | | |
|---|---|---|
| DE | 1048165 B | 12/1958 |
| DE | 1811683 U | 5/1960 |

(Continued)

OTHER PUBLICATIONS

European Search Report (EP 14172744.6), Oct. 10, 2014.

*Primary Examiner* — Pamela Rodriguez
(74) *Attorney, Agent, or Firm* — Leydig, Voit & Mayer, Ltd.

(57) ABSTRACT

An air spring attachment system for motor vehicles. The air spring attachment system includes at least one air spring and at least one link for the suspension of a wheel on a chassis. The air spring attachment system also includes a plug-in connection connecting the air spring to the link.

10 Claims, 3 Drawing Sheets

(56) References Cited

FOREIGN PATENT DOCUMENTS

| | | |
|---|---|---|
| DE | 3811306 A1 | 11/1988 |
| DE | 4213676 A1 | 10/1993 |
| DE | 69322465 T2 | 4/1999 |
| DE | 102008061190 A1 | 6/2010 |
| DE | 102011051237 A1 | 12/2012 |
| EP | 1647424 A1 | 4/2006 |
| WO | WO 0032959 A1 | 6/2000 |
| WO | WO 2012103339 A1 | 8/2012 |

* cited by examiner

US 9,327,573 B2

AIR SPRING ATTACHMENT SYSTEM

CROSS-REFERENCE TO RELATED APPLICATIONS

This application claims priority from German Patent Application No. DE 10 2013 106 290.3, filed Jun. 17, 2013, which is hereby incorporated by reference herein in its entirety.

FIELD

The present invention relates to an air spring attachment system for motor vehicles, particularly for work vehicles, comprising at least one air spring and at least one link for the suspension of a wheel on a chassis.

BACKGROUND

Systems of this type are used particularly for connecting a chassis of a work vehicle to a non-driven rear wheel. For this purpose, the link is connected to the chassis so as to be pivotable at its end, and the wheel axle is firmly connected to the link via an attachment device. In order to dampen the vibrations caused by the road surface, an air spring, which is supported against the chassis, is disposed at the free end of the link.

In order to attach the air spring to the link, it is known to attach the air spring, particularly its rolling piston, to the link via a screwed connection.

For example, an axle suspension for a vehicle axle is apparent from DE 10 2008 061 190 A1, which comprises an axle link to whose free end an air spring is attached. For this purpose, the axle link has at its end a contact surface for supporting the air spring, which is provided with bores for inserting screws for the attachment of the air spring to the axle link.

However, the attachment of the air spring to the axle link by means of a screwed connection is disadvantageous in that an extensive finishing of the link, particularly of the contact surface and/or the attachment surface for the air spring, is required. Since the links are mostly manufactured as forged parts, the assembly bores have to be inserted in a subsequent work step. Furthermore, other work steps may also be required, such as, for example, surface milling of the contact surface as well as welding. Moreover, an additional element in the form of a steel reinforcing plate that has to be placed on the attachment surface is required in order to attach a plastic rolling piston.

Furthermore, a rolling piston for an air spring bellows is apparent from DE 10 2011 051 237 A1, which is used on a driven axle and connected to the chassis of a motor vehicle via a connecting part. To this end, the rolling piston has at its piston base a latching or snap-in connection that cooperates with the connecting part. In this case, it is disadvantageous that the force application plane or the force application point is disposed in the region of the piston base. Therefore, additional reinforcing means are required on the side of the link in order to attach the rolling piston, such as, for example, plates or a link with an increased contact surface, which renders the attachment more expensive.

SUMMARY

In an embodiment, the present invention provides an air spring attachment system for motor vehicles. The air spring attachment system includes at least one air spring and at least one link for the suspension of a wheel on a chassis. The air spring attachment system also includes a plug-in connection connecting the air spring to the link.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
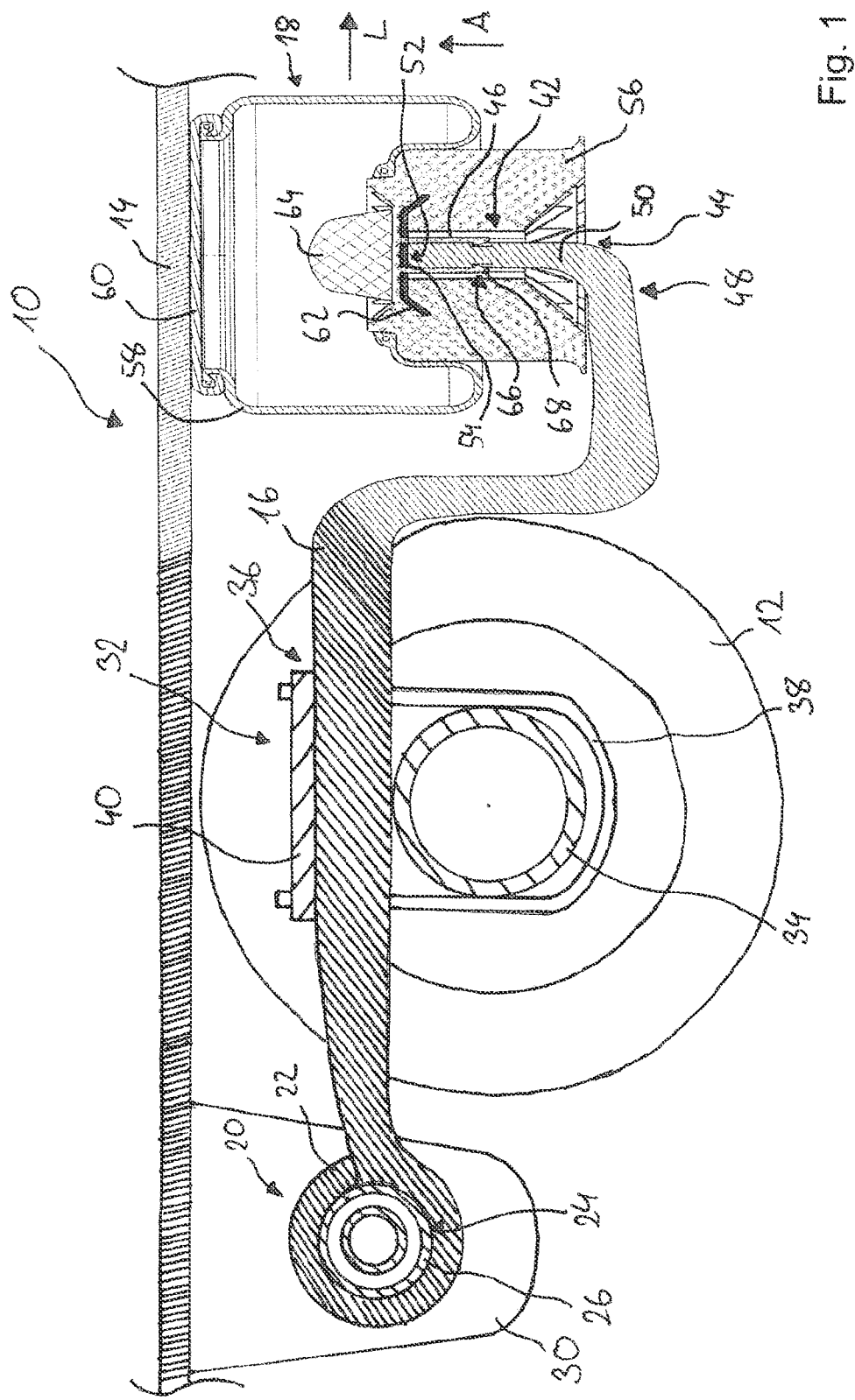
FIG. 1 shows a longitudinal section through an air spring attachment system according to the invention.

In an embodiment of the present invention provides an air spring attachment system that ensures a simple and cost-effective attachment of an air spring to a link.

The air spring attachment system according to the invention comprises at least one air spring and at least one link for the suspension of a wheel on a chassis. A plug-in connection is provided for connecting the air spring to the link. The plug-in connection provides for a simple assembly and attachment of the air spring to the link. In particular, a subsequent elaborate processing of a contact surface or of an attachment surface of the link can be omitted. Therefore, the air spring attachment system according to the invention constitutes a cost-effective solution for connecting an air spring to a link. Compared to the flat contact surface, the plug-in connection enables a better force distribution, so that the link geometry can be optimally adapted to the force path. Thus, the link of the air spring attachment system according to the invention has an increased strength compared with conventional links. Moreover, the advantage in strength makes it possible to economize on material, because, for the same strength, less material is required for forming the link. This also results in an advantage with regard to weight, which, consequently, reduces fuel consumption. Furthermore, a plug-in connection enables the realization of a rotary movement and/or an oscillating movement of the air spring during operation, so that large angles can be compensated. Thus, smaller loads act on a rolling piston and an air spring bellows of the air spring, which results in improved air spring characteristics and a longer life of the rolling piston. Furthermore, no additional reinforcing plate is required for the connection of a plastic rolling piston. Advantageously, the air spring attachment system according to the invention is used in the case of non-driven axles, particularly in the case of non-driven trailer axles.

In an advantageous embodiment, the plug-in connection comprises a plug-in pin and a plug-in slot, wherein the plug-in pin can be plugged into the plug-in slot in such a way that the plug-in pin comes to abut the bottom of the plug-in slot and forms a force transmission plane. The force transmission plane corresponds to a contact surface between the rolling piston and the plug-in pin. Via the force transmission plane, the forces occurring during the dampening of the vibrations are introduced into the link. Advantageously, the plug-in pin and the plug-in slot are configured in such a way that relative movements of the plug-in pin relative to the plug-in slot are possible. Thus, the air spring is capable of executing both oscillating movements as well as rotary movements. Furthermore, the plug-in pin can be positively accommodated in the plug-in slot.

Advantageously, the air spring has at least one rolling piston with a base portion facing towards the link and a cover portion facing away from the link, with the force transmission plane being disposed in the region of the cover portion. Thus, the plug-in connection shifts the force application point from the lower rolling piston plane, which corresponds to the base portion of the rolling piston, to the upper rolling piston plane, which corresponds to the cover portion of the rolling piston. Thus, the forces are directly introduced into the link, particularly if a stop or buffer in the region of the cover portion is used. Thus, no additional reinforcing means are required on the side of the link, such as, for example, plates or an increased contact surface.

As another advantage, the plug-in connection comprises at least one securing device that secures the air spring against being pulled off the link in the axial direction.

The securing device is advantageously configured as a snap-in connection. In the present case, a snap-in connection is understood to be a clip connection. Furthermore, the securing device can be configured as a bayonet lock. Moreover, it is also possible to configure the securing device as a non-positive connection. In this case, the plug-in pin can be screwed into the plug-in slot and/or secured by means of a clamp connection.

In another advantageous embodiment, the snap-in connection is formed from at least one depression introduced into the plug-in pin and at least one spring member protruding into the plug-in slot, wherein the spring member latches into the depression after the plug-in pin has been plugged into the plug-in slot. The snap-in connection or clip connection secures the air spring against being pulled off in the axial direction. The efficiency of the clip connection is increased particularly by the lateral guidance of the plug-in pin within the plug-in slot. As a further advantage, several depressions in the plug-in pin and several spring members, which correspond thereto, which protrude into the plug-in slot and which latch into the depressions, can be provided in order to increase the pull-off force in the axial direction.

As a further advantage, the plug-in pin is disposed on the link. In an advantageous embodiment, the plug-in pin extends perpendicularly to a longitudinal plane of the link. The configuration of the plug-in pin on the link makes a simple attachment of the air spring to the link possible.

In an advantageous embodiment, the plug-in pin is formed from a bent end section of the link. The plug-in pin can thus be manufactured in a cost-effective manner. Furthermore, the bend ensures a favorable force path. Furthermore, the plug-in pin can be configured as a separate part, which is attached, in particular welded, to an end section of a link.

As a further advantage, the plug-in slot is inserted into the rolling piston. Advantageously, the rolling piston is made from plastic. A rolling piston made from plastic can be produced by means of injection molding, with the spring members protruding into the plug-in slot being produced during the injection molding process. In particular, the rolling piston can be produced as a single piece, which increases the strength of the rolling piston. In addition, a rolling piston made from plastic has a low weight and, in addition, is cost-effective to produce. Furthermore, a metal supporting member can be inserted into the rolling piston, with the plug-in pin resting against the supporting member. The force transmission plane is thus formed between the supporting member and the plug-in pin. The supporting member ensures an improved transmission of force from the air spring to the link. Furthermore, the rolling piston may have a stop that limits the movement of the air spring in the axial direction. Furthermore, the rolling piston may also be manufactured from metal.

In an advantageous embodiment, the link is produced by means of forging and/or casting. Particularly a link produced by forging has a high strength. Furthermore, both the plug-in pin and the depression or depressions inserted into the plug-in pin can be produced during forging and/or casting. Thus, all production steps can be integrated into the production process, which makes the production of the link comparatively cost-effective. Advantageously, the link is made from metal, particularly from steel.

The invention is explained below in more detail with reference to an exemplary embodiment that is schematically depicted in the Figures.

FIG. 1 shows an air spring attachment system 10 according to the invention, which is used for the suspension of a non-driven wheel axle 34, particularly of a non-driven trailer axle, of a scaled-down wheel 12 on a chassis 14. The air spring attachment system 10 comprises a link 16 and an air spring 18 connected to the link 16.

On a first end section 20, the link 16 has a bearing portion 22 which pivotably connects the link 16 to the chassis 14. In the present exemplary embodiment, the bearing portion 22 is formed from the first end section 20, which is bent into an accommodating opening 24. An elastic bearing 26, which pivotably connects the link 16 to an attachment flange 30 attached to the chassis 14, is inserted into the accommodating opening 24.

Furthermore, the link 16 comprises an attachment portion 32 for attaching the wheel axle 34. The wheel axle 34 is attached by means of an attachment device 36 comprising two brackets 38 and a plate 40. As is apparent particularly from FIG. 3, the bent sections of the brackets 38 accommodate the wheel axle 34. In order to attach the wheel axle 34, the brackets 38 are screwed with their free ends to the plate 40 by means of screws with the plate 40 resting on an upper face of the link 16.

Figure 2:
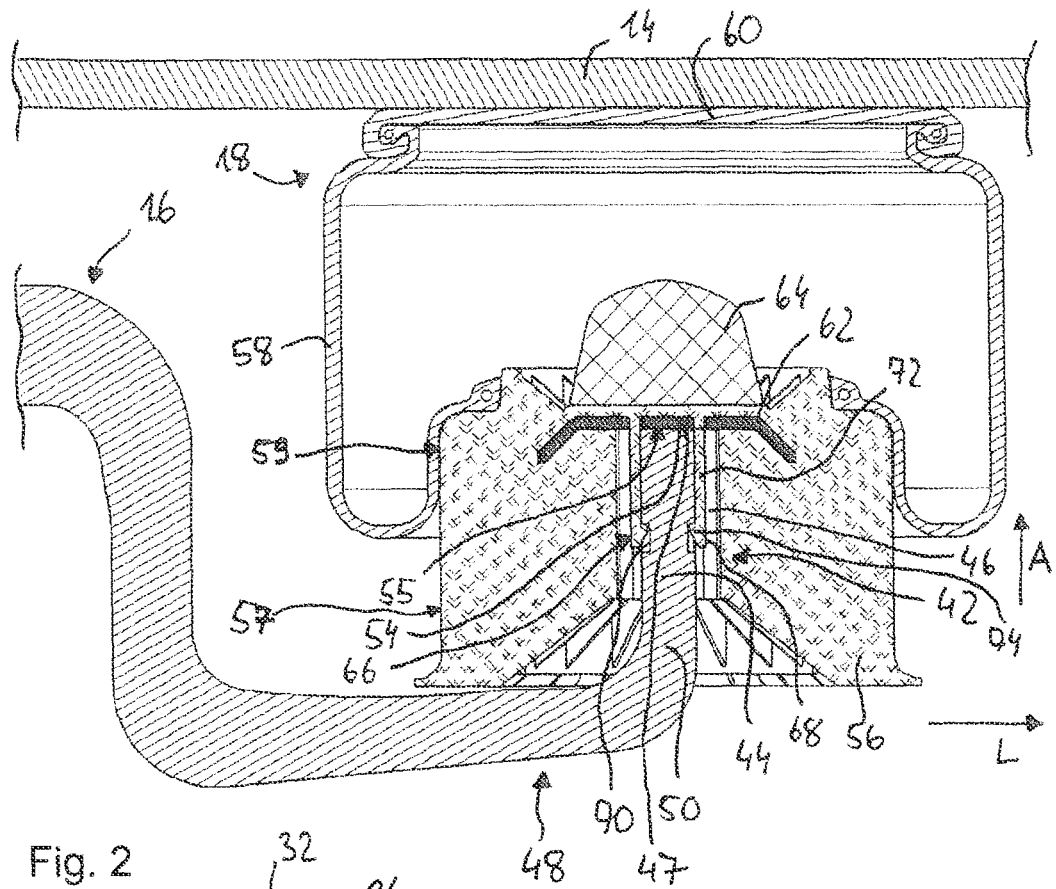
FIG. 2 shows an enlarged part of the longitudinal section through the air spring attachment system according to the invention.

As is apparent particularly from FIGS. 1 and 2, the air spring attachment system 10 comprises a plug-in connection 42 for attaching the air spring 18 to the link 16. The plug-in connection 42 is formed from a plug-in pin 44 and a plug-in slot 46. The plug-in pin 44 is disposed on a second end section 48 of the link 16, with the plug-in pin 44 being formed from an end section 50 of the second end section 48 bent approximately perpendicularly to the longitudinal plane L of the link 16. A free end 52 of the plug-in pin 44 serves as a contact surface 54 for the air spring 18 or the rolling piston 56 thereof.

Figure 3:
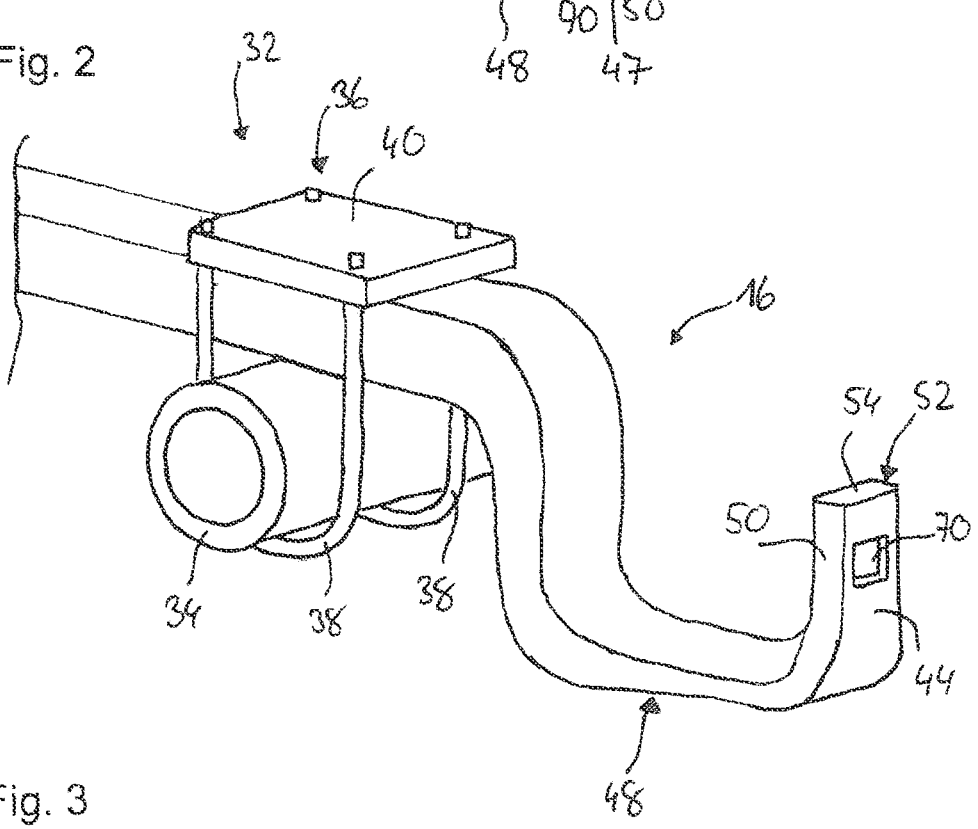
FIG. 3 shows an enlarged perspective view of a link of the air spring attachment system according to the invention.
Figure 4:
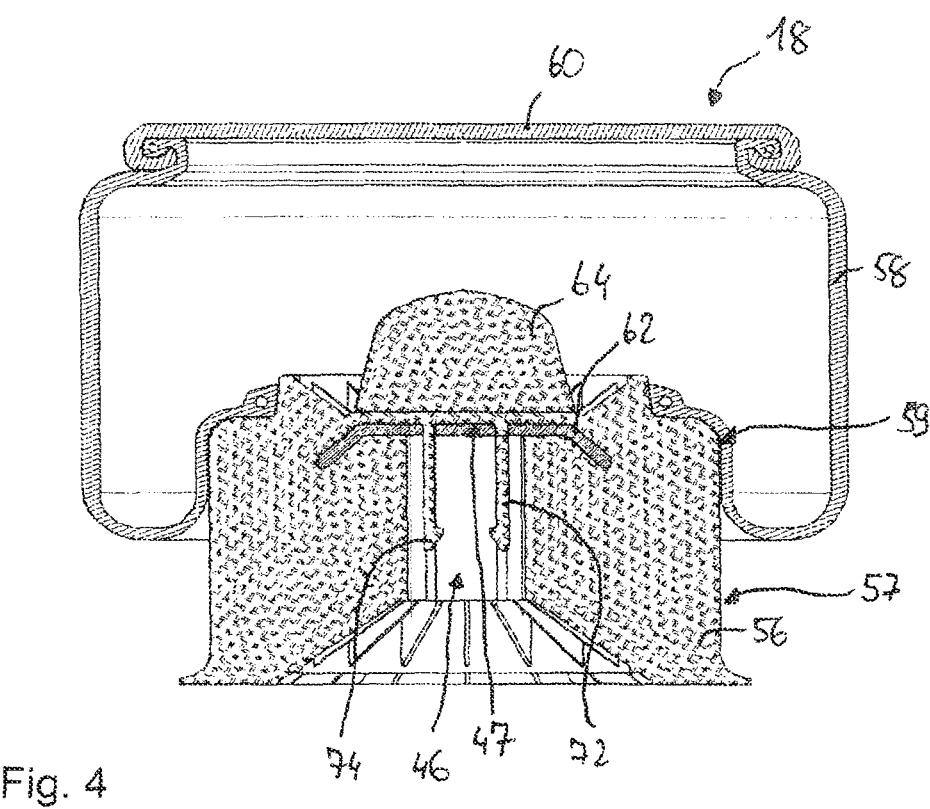
FIG. 4 shows a longitudinal section through an air spring of the air spring attachment system according to the invention.

As is apparent particularly from FIGS. 2 and 3, the air spring 18 comprises a rolling piston 56, an air spring bellows or rolling bellows 58 and an end plate 60. The rolling bellows 58 is attached to the end plate 60 and the rolling piston 56 and thus forms a hermetically sealed working chamber. The air spring 18 is supported on the chassis 14 via the end plate 60. The rolling piston 56 comprises a base portion 57 and a cover portion 59, wherein a buffer or stop 64 protruding into the working chamber of the air spring is disposed on the cover portion 59. The stop 64 limits the stroke of the rolling piston 56 in the axial direction A. In addition, a metal supporting member 62 is inserted into the rolling piston 56. The supporting member 62 serves for transmitting the force acting on the rolling piston 56 during the damping work to the link 16 and thus ensure an improved flow of force. According to an alternative embodiment, the rolling piston 56 can be formed without a stop 64 and/or a supporting member 62.

Furthermore, the plug-in slot 46 is inserted into the rolling piston 56. In the plugged-in or plugged-on state, as is apparent particularly from FIG. 2, the contact surface 54 of the plug-in pin 44 rests against a bottom 47 of the plug-in slot 46, particularly against an underside of the supporting member 62, and forms a force transmission plane 55. Thus, the plug-in connection 42 shifts the force transmission plane 55 into the region of the cover portion 59, so that forces, in particular large forces, are introduced directly into the link 16. Thus, no additional reinforcing means are required on the side of the link, such as, for example, plates or an increased link contact surface. In order to secure the rolling piston 56 against being pulled off the plug-in pin 44 in the axial direction A, the plug-in connection 42 comprises a securing device 66. In the present exemplary embodiment, the securing device 66 is configured as a clip connection 68. The clip connection 68 comprises two depressions 70 introduced into the plug-in pin 44 and two spring members 72 protruding into the plug-in slot 46, which latch into the depressions 70. The spring members 72 are disposed at the bottom 47 of the plug-in slot 46 and protrude into the plug-in slot 46. Furthermore, the spring members 72 have at their free ends a latching hook 74 that latches into the depression 70.

In order to attach the air spring 18 to the link 16, the air spring 18 is plugged onto the plug-in pin 44. In the process, the plug-in pin 44 is inserted into the plug-in slot 46 of the rolling piston 56 until the contact surface 54 of the plug-in pin 44 comes to rest against the bottom 47 of the plug-in slot 46 or the underside of the supporting member 62 and thus forms the force transmission plane 55. During the plug-in process, the spring members 72 are elastically deflected and snap into the depressions 70 when the latching hooks 74 are located at the level of the depressions 70. The rolling piston 56 is laterally guided by the plug-in pin 44, which protrudes far into the plug-in slot 46. This increases the efficiency of the clip connection 68. Furthermore, the plug-in pin 44 and the plug-in slot 46 are configured in such a way that the rolling piston 56 is able to execute an oscillating movement as well as a rotary movement in the plugged-on state. Thus, larger angles that occur during the damping work can be compensated. This results in improved air spring characteristics and a longer life of the rolling piston 56.

The link 16 can be produced by means of forging and/or casting, with the plug-in pin 44 and the depressions 70 introduced into it being produced during casting and/or forging. The rolling piston 56 is produced by means of injection molding from plastic, with the supporting member 62 being inserted into an injection mold prior to injection molding, so that the supporting member 62 is overmolded with the plastic mass. The spring members 72 are advantageously molded on to the bottom of the plug-in slot 46. In an alternative embodiment, the rolling piston 56 may be manufactured from metal.

The air spring attachment system 10 according to the invention is characterized particularly by its plug-in connection 42 for attaching the air spring 18 to the link 16. Thus, a simplified assembly of the air spring 18 to the link 16 is ensured. In addition, elaborate subsequent processing steps for the link 16 can be omitted. Furthermore, the link geometry can be adapted to the force path. Furthermore, the plug-in connection 42 makes it possible for the rolling piston 56 to execute oscillating movements and rotary movements. In turn, this results in improved air spring characteristics and an increased life of the rolling piston 56. In addition, the plug-in connection 42 shifts the force transmission plane 55 into the region of the cover portion 59, so that no additional reinforcing means are required on the side of the link.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SIGN LIST

10 Air spring attachment system
12 Wheel
14 Chassis
16 Link
18 Air spring
20 First end section
22 Bearing portion
24 Accommodating opening
26 Elastic bearing
30 Attachment flange
32 Attachment portion
34 Wheel axle
36 Attachment device
38 Bracket
40 Plate
42 Plug-in connection
44 Plug-in pin
46 Plug-in slot
47 Bottom
48 Second end section
50 Bent end section
52 Free end
54 Contact surface
55 Force transmission plane
56 Rolling piston
57 Base portion
58 Rolling bellows
59 Cover portion
60 End plate
62 Supporting member
64 Stop
66 Securing device
68 Clip connection
70 Depression 72 Spring member
74 Latching hook
L Longitudinal plane
A Axial direction

The invention claimed is:

1. An air spring attachment system for motor vehicles, the air spring attachment system comprising:
   at least one air spring and at least one link for the suspension of a wheel on a chassis; and
   a plug-in connection connecting the air spring to the link, the plug-in connection having a plug-in pin and a plug-in slot, the plug-in pin being a bent end section of the link.

2. The air spring attachment system according to claim 1, wherein the plug-in pin is configured to plug into the plug-in slot such that the plug-in pin comes to abut a bottom of the plug-in slot and forms a force transmission plane.

3. The air spring attachment system according to claim 2, wherein the air spring includes at least one rolling piston with a base portion facing towards the link and a cover portion facing away from the link, wherein the force transmission plane is disposed in the region of the cover portion.

4. The air spring attachment device according to claim 2, wherein the plug-in pin extends perpendicularly to a longitudinal plane of the link.

5. The air spring attachment system according to claim 2, wherein the plug-in slot is inserted into the rolling piston.

6. The air spring attachment system according to claim 1, wherein the plug-in connection comprises at least one securing device that secures the air spring against being pulled off the link in an axial direction.

7. The air spring attachment system according to claim 6, wherein the securing device is configured as a snap-in connection.

8. The air spring attachment system according to claim 7, snap-in connection is formed from at least one depression introduced into the plug-in pin and at least one spring member protruding into the plug-in slot, wherein the spring member latches into the depression after the plug-in pin has been plugged into the plug-in slot.

9. The air spring attachment system according to claim 1, wherein the link is produced by at least one of forging or casting.

10. The air spring attachment system according to claim 1, wherein the motor vehicle is a work vehicle.

* * * * *